(12) United States Patent
Smith

(10) Patent No.: US 10,113,603 B2
(45) Date of Patent: Oct. 30, 2018

(54) GAS SPRING END MEMBER AS WELL AS GAS SPRING AND DAMPER ASSEMBLY AND SUSPENSION SYSTEM INCLUDING SAME

(71) Applicant: Firestone Industrial Products Company, LLC, Indianapolis, IN (US)

(72) Inventor: Scott A. Smith, Brownsburg, IN (US)

(73) Assignee: Firestone Industrial Products Company, LLC, Nashville, TN (US)

( * ) Notice: Subject to any disclaimer, the term of this patent is extended or adjusted under 35 U.S.C. 154(b) by 0 days.

(21) Appl. No.: 15/476,239

(22) Filed: Mar. 31, 2017

(65) Prior Publication Data

US 2017/0284493 A1    Oct. 5, 2017

Related U.S. Application Data

(60) Provisional application No. 62/317,479, filed on Apr. 1, 2016.

(51) Int. Cl.

| | |
|---|---|
| *F16F 9/084* | (2006.01) |
| *F16F 9/05* | (2006.01) |
| *F16F 9/04* | (2006.01) |
| *F16F 9/36* | (2006.01) |
| *B60G 15/12* | (2006.01) |
| *F16F 9/02* | (2006.01) |

(52) U.S. Cl.
CPC .............. *F16F 9/084* (2013.01); *B60G 15/12* (2013.01); *F16F 9/0472* (2013.01); *F16F 9/05* (2013.01); *F16F 9/057* (2013.01); *F16F 9/36* (2013.01); *B60G 2202/314* (2013.01); *B60G 2204/1262* (2013.01); *F16F 9/0209* (2013.01); *F16F 2232/08* (2013.01)

(58) Field of Classification Search
CPC .. F16F 9/084; F16F 9/05; F16F 9/0472; F16F 9/36; F16F 9/057; F16F 2232/08; F16F 9/0209; B60G 15/12; B60G 2202/314; B60G 2204/1262
USPC ................... 267/64.24, 64.21, 64.23, 64.27; 188/322.12
See application file for complete search history.

(56) References Cited

U.S. PATENT DOCUMENTS

| | | | | |
|---|---|---|---|---|
| 3,046,001 A | * | 7/1962 | Schultze | ................ B60G 15/12 267/64.24 |
| 3,046,002 A | * | 7/1962 | Schmitz | .................. F16F 9/084 267/64.24 |

(Continued)

FOREIGN PATENT DOCUMENTS

JP          01-182642 A   *   7/1989

*Primary Examiner* — Thomas J Williams
*Assistant Examiner* — Mariano Sy
(74) *Attorney, Agent, or Firm* — Fay Sharpe LLP

(57) ABSTRACT

Gas spring end members dimensioned for securement between an associated flexible spring member and an associated damper housing has a longitudinal axis. The end member includes an end member wall extending between first and second ends. An end wall portion is oriented transverse to the longitudinal axis and a side wall portion extends axially from along the end wall portion to a distal edge. An end member recess is dimensioned to receive the associated damper housing. A securement device removably retains the end member in operative engagement with the associated damper housing. Gas spring and damper assemblies and suspension systems are also included.

18 Claims, 10 Drawing Sheets

(56) References Cited

U.S. PATENT DOCUMENTS

| | | | | |
|---|---|---|---|---|
| 4,022,448 A * | 5/1977 | Reeder | ................... | F16F 9/084 |
| | | | | 188/269 |
| 4,316,604 A * | 2/1982 | Makita | ................... | B60G 17/04 |
| | | | | 267/64.19 |
| 6,905,126 B1 * | 6/2005 | Jurrens | ................. | B60G 15/14 |
| | | | | 280/284 |
| 7,473,082 B2 * | 1/2009 | Marielle | ................ | F01O 17/06 |
| | | | | 403/362 |
| 9,206,874 B2 * | 12/2015 | Sugata | ................. | B60G 15/12 |
| 9,611,001 B2 * | 4/2017 | Awasa | ................ | B62K 25/283 |
| 2007/0126163 A1 * | 6/2007 | Leonard | ................... | F16F 9/05 |
| | | | | 267/64.27 |

* cited by examiner

GAS SPRING END MEMBER AS WELL AS GAS SPRING AND DAMPER ASSEMBLY AND SUSPENSION SYSTEM INCLUDING SAME

This application claims priority from U.S. Provisional Patent Application No. 62/317,479, filed on Apr. 1, 2016, the entire disclosure of which is hereby incorporated by reference herein.

BACKGROUND

The subject matter of the present disclosure broadly relates to the art of spring and damping devices and, more particularly, to gas spring and damper assemblies with gas spring end members removably retained in position during uninflated and underinflated conditions of the gas spring. Suspension systems including at least one of such gas spring and damper assemblies are also included.

The subject matter of the present disclosure may find particular application and use in conjunction with components for suspension systems of wheeled vehicles, and will be shown and described herein with reference thereto. However, it is to be appreciated that the subject matter of the present disclosure is also amenable to use in other applications and environments, and that the specific uses shown and described herein are merely exemplary. For example, the subject matter of the present disclosure could be used in connection with gas spring and damper assemblies of non-wheeled vehicles, support structures, height adjusting systems and actuators associated with industrial machinery, components thereof and/or other such equipment. Accordingly, it will be recognized and appreciated that the subject matter of the present disclosure is not intended to be limited to use associated with suspension systems of wheeled vehicles.

Wheeled motor vehicles of most types and kinds include a sprung mass, such as a body or chassis, for example, and an unsprung mass, such as two or more axles or other wheel-engaging members, for example, with a suspension system disposed therebetween. Typically, a suspension system will include a plurality of spring devices as well as a plurality of damping devices that together permit the sprung and unsprung masses of the vehicle to move in a somewhat controlled manner relative to one another. Movement of the sprung and unsprung masses toward one another is normally referred to in the art as jounce motion while movement of the sprung and unsprung masses away from one another is commonly referred to in the art as rebound motion.

Generally, the plurality of spring elements function to accommodate forces and loads associated with the operation and use of the vehicle, and the plurality of damping devices are operative to dissipate undesired inputs and movements of the vehicle, particularly during dynamic operation thereof. Often, the spring elements are metal spring elements (e.g., coil springs, torsion springs) and the dampers are liquid-filled, hydraulic dampers that are secured between the sprung and unsprung masses of the vehicle separately from the spring elements. In other cases, however, gas spring and damper assemblies can be used, such as those that include a gas spring and a damper element that are operatively connected with one another.

Notwithstanding the overall success of such known constructions, certain disadvantages may still exist that could be limiting to broader adoption and/or use of gas spring and damper assemblies. Non-limiting examples of properties and/or characteristics that may be desired over known constructions can include improved performance, reduced weight, simplified construction, ease of assembly or repair and/or decreased cost of manufacture. Accordingly, it is believed desirable to develop gas spring and damper assemblies that overcome the foregoing and/or other problems and/or disadvantages of known designs, or otherwise advance the art of gas spring and damper devices.

BRIEF SUMMARY

One example of a gas spring and damper assembly in accordance with the subject matter of the present disclosure can include a damper assembly having a longitudinally-extending axis and a gas spring assembly. The damper assembly can include a damper housing that can include a housing wall extending axially between opposing first and second ends. The housing wall can at least partially define a damping chamber containing a quantity of damping fluid. A damper rod assembly can include an elongated damper rod and a damper piston secured along the elongated damper rod. The damper rod assembly can be operatively interengaged with the damper housing for reciprocal displacement relative thereto with the damper piston disposed within the damping chamber and at least a portion of the elongated damper rod projecting axially outwardly from the first end of the damper housing. The gas spring assembly can include a first end member supported on the elongated damper rod in substantially fixed axial relation thereto. A second end member can be supported on the damper housing in substantially fixed relation thereto. The second end member can include at least one securement feature. A flexible spring member can be secured between the first and second end members to at least partially define a spring chamber. At least one securement device can operatively engage the damper housing. The at least one securement device can be operatively connected with the at least one securement feature of the second end member to retain the at least one securement device in operative engagement with the damper housing and thereby removably secure the second end member in the substantially fixed axial relation with the damper housing.

One example of a suspension system in accordance with the subject matter of the present disclosure can include a pressurized gas system that includes a pressurized gas source and a control device. The suspension system can also include at least one gas spring and damper assembly according to the foregoing paragraph. The at least one gas spring and damper assembly can be disposed in fluid communication with the pressurized gas source through the control device such that pressurized gas can be selectively transferred into and out of the spring chamber.

One example of a gas spring end member in accordance with the subject matter of the present disclosure can be dimensioned for securement between an associated flexible spring member and an associated damper housing. The gas spring end member can have a longitudinal axis and can include an end member wall extending peripherally about the longitudinal axis and axially between a first end and a second end opposite the first end. The end member wall can include an end wall portion oriented transverse to the longitudinal axis and a side wall portion extending axially from along the end wall portion to a distal edge. The end wall portion and the side wall portion can at least partially define an end member recess dimensioned to receive the associated damper housing. The side wall portion can include an outer surface dimensioned for receiving the associated flexible spring member. At least one securement feature can extend through the side wall portion. The at least one securement feature can be oriented transverse to the longitudinal axis and can extend radially inward through the side wall portion. At least one securement device can be operatively connected with the at least one securement feature of the end member for retaining the at least one securement device in operative engagement with the associated damper housing.

DETAILED DESCRIPTION

Turning now to the drawings, it is to be understood that the showings are for purposes of illustrating examples of the subject matter of the present disclosure and are not intended to be limiting. Additionally, it will be appreciated that the drawings are not to scale and that portions of certain features and/or elements may be exaggerated for purposes of clarity and/or ease of understanding.

Figure 1:
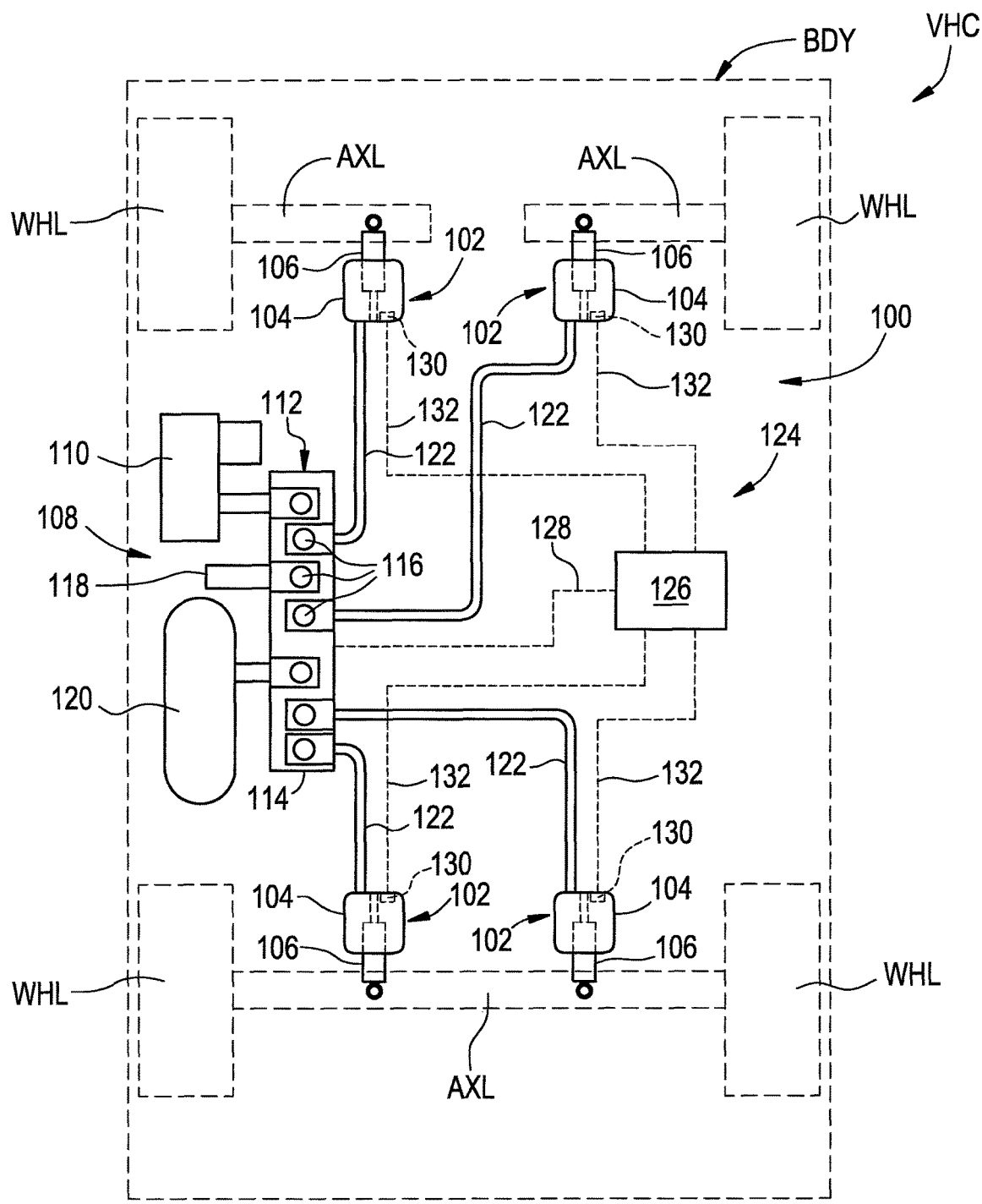
FIG. 1 is a schematic representation of one example of a suspension system of an associated vehicle including at least one gas spring and damper assembly in accordance with the subject matter of the present disclosure.
Figure 2:
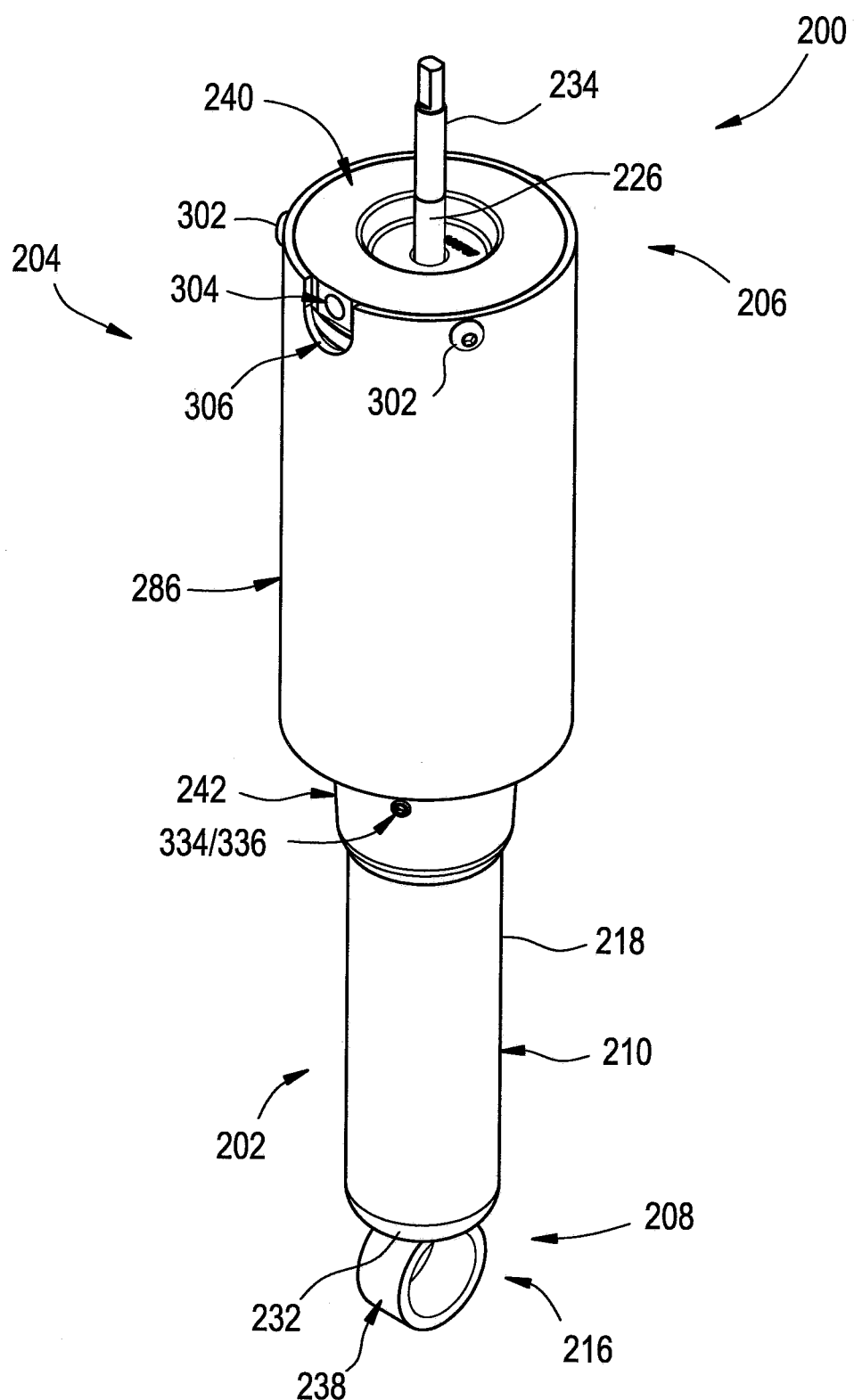
FIG. 2 is a top perspective view of one example of a gas spring and damper assembly in accordance with the subject matter of the present disclosure.

FIG. 1 illustrates one example of a suspension system 100 disposed between a sprung mass, such as an associated vehicle body BDY, for example, and an unsprung mass, such as an associated wheel WHL or an associated axle AXL, for example, of an associated vehicle VHC. It will be appreciated that any one or more of the components of the suspension system can be operatively connected between the sprung and unsprung masses of the associated vehicle in any suitable manner.

The suspension system can include any combination spring and damper devices operatively disposed between the sprung and unsprung masses of the associated vehicle. For example, a suspension system can include one or more gas spring and damper assemblies in accordance with the subject matter of the present disclosure. In many cases, two or more of such gas spring and damper assemblies in accordance with the subject matter of the present disclosure may be used. Additionally, in some cases, one or more spring (e.g., gas spring assemblies, coil spring assemblies, torsion bar assemblies) and one or more dampers (e.g., conventional shock absorbers or struts) can, optionally, be provided as separate components.

In the arrangement shown in FIG. 1, suspension system 100 includes four gas spring and damper assemblies 102, one of which is disposed toward each corner of the associated vehicle adjacent a corresponding wheel WHL. However, it will be appreciated that any other suitable number of gas spring and damper assemblies could alternately be used in any other configuration and/or arrangement, such as has been discussed above, for example. As shown in FIG. 1, gas spring and damper assemblies 102 are supported between axles AXL and body BDY of associated vehicle VHC, and include a gas spring 104 and a damper 106. It will be recognized that gas springs 104 are shown and described in connection with FIG. 1 as being of a rolling lobe-type construction. It is to be understood, however, that gas spring assemblies of other types, kinds and/or constructions could alternately be used without departing from the subject matter of the present disclosure.

Suspension system 100 also includes a pressurized gas system 108 operatively associated with the gas spring assemblies for selectively supplying pressurized gas (e.g., air) thereto and selectively transferring pressurized gas therefrom. In the exemplary embodiment shown in FIG. 1, pressurized gas system 108 includes a pressurized gas source, such as a compressor 110, for example, for generating pressurized air or other gases. A control device, such as a valve assembly 112, for example, is shown as being in communication with compressor 110 and can be of any suitable configuration or arrangement. In the exemplary embodiment shown, valve assembly 112 includes a valve block 114 with a plurality of valves 116 supported thereon. Valve assembly 112 can also, optionally, include a suitable exhaust, such as a muffler 118, for example, for venting pressurized gas from the system. Optionally, pressurized gas system 108 can also include a reservoir 120 in fluid communication with the compressor and/or valve assembly 112 and suitable for storing pressurized gas.

Valve assembly 112 is shown as being in communication with gas springs 104 of assemblies 102 through suitable gas transfer lines 122. As such, pressurized gas can be selectively transferred into and/or out of the gas springs through valve assembly 112 by selectively operating valves 116, such as to alter or maintain vehicle height at one or more corners of the vehicle, for example.

Suspension system 100 can also include a control system 124 that is capable of communication with any one or more systems and/or components of vehicle VHC and/or suspension system 100, such as for selective operation and/or control thereof. Control system 124 can include a controller or electronic control unit (ECU) 126 communicatively coupled with compressor 110 and/or valve assembly 112, such as through a conductor or lead 128, for example, for selective operation and control thereof, which can include supplying and exhausting pressurized gas to and/or from gas spring and damper assemblies 102. Controller 126 can be of any suitable type, kind and/or configuration.

Control system 124 can also, optionally, include one or more height (or distance) sensing devices 130, such as, for example, may be operatively associated with the gas spring assemblies and capable of outputting or otherwise generating data, signals and/or other communications having a relation to a height of the gas spring assemblies or a distance between other components of the vehicle. Height sensing devices 130 can be in communication with ECU 126, which can receive the height or distance signals therefrom. The height sensing devices can be in communication with ECU 126 in any suitable manner, such as through conductors or leads 132, for example. Additionally, it will be appreciated that the height sensing devices can be of any suitable type, kind and/or construction, such as may operate using sound, pressure, light and/or electromagnetic waves, for example.

Having described an example of a suspension system (e.g., suspension system 100) that can include a gas spring and damper assembly in accordance with the subject matter of the present disclosure (e.g., gas spring and damper assembly 102), one example of such a gas spring and damper assembly will now be described in connection with FIGS. 2-10. As shown therein, a gas spring and damper assembly 200, such as may be suitable for use as a gas spring and damper assembly 102 in FIG. 1, for example, is shown as including a damper assembly 202 and a gas spring assembly 204 that is operatively connected with the damper assembly. It will be appreciated that, in use, gas spring and damper assembly 200 can undergo changes in length (i.e., can be displaced between extended or jounce conditions, and collapsed or rebound conditions) as a suspension system within which one or more assemblies are installed dynamically moves to accommodate forces and/or inputs acting on the vehicle.

Figure 5:
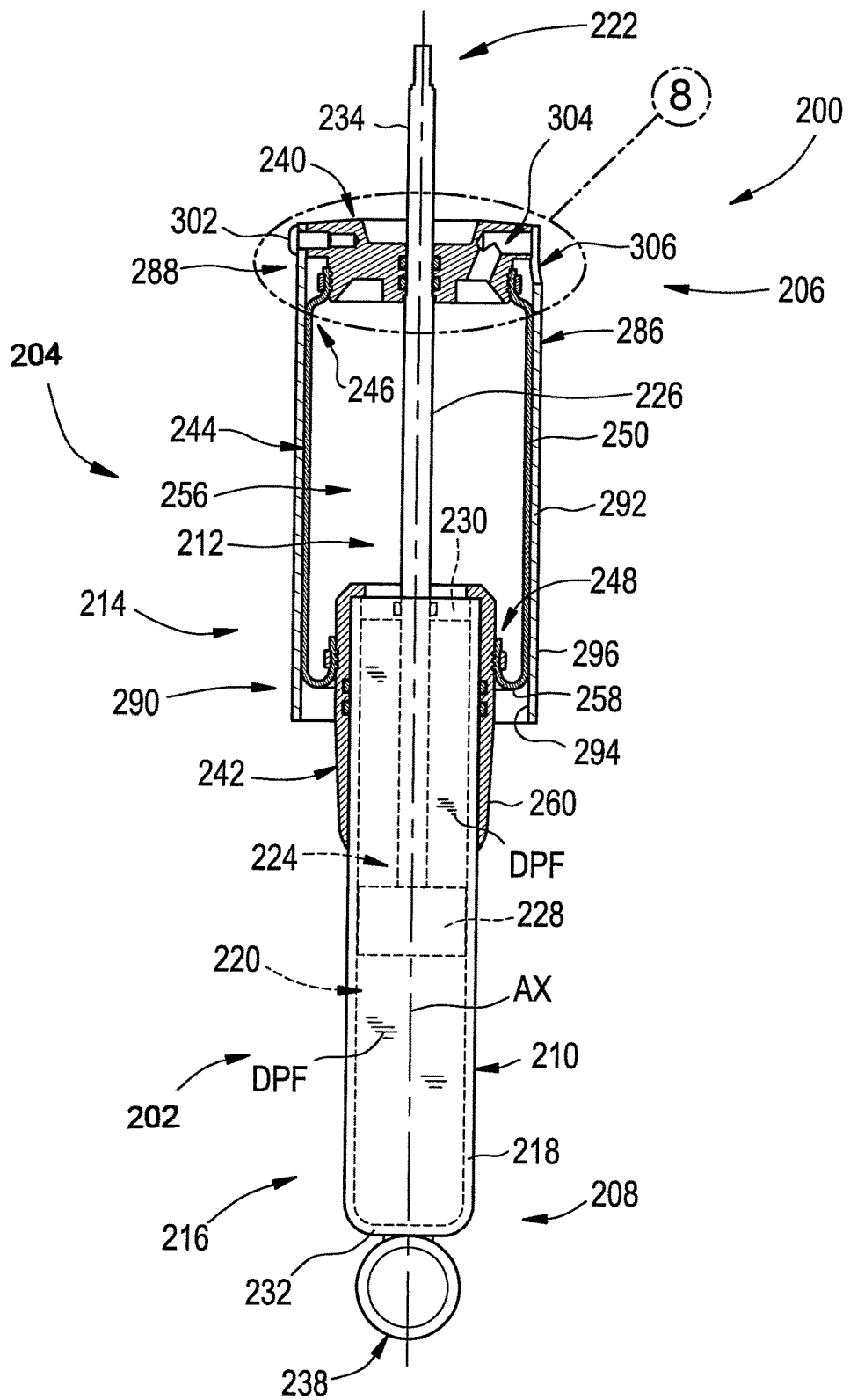
FIG. 5 is a side elevation view, in partial cross section, of the exemplary gas spring and damper assembly in FIGS. 2-4 taken from along line 5-5 in FIG. 3.
Figure 6:
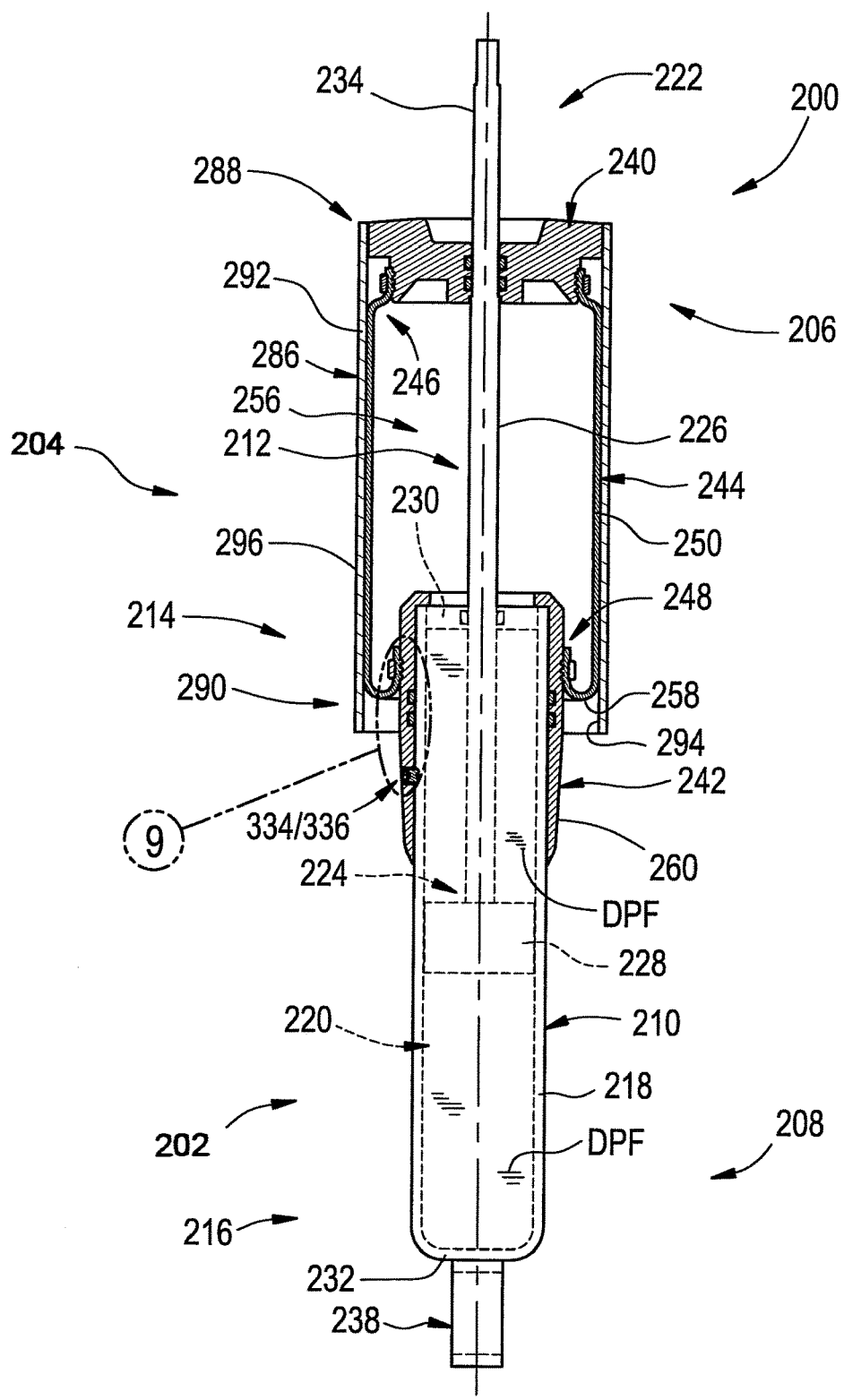
FIG. 6 is a side elevation view, in partial cross section, of the exemplary gas spring and damper assembly in FIGS. 2-5 taken from along line 6-6 in FIG. 4.
Figure 7:
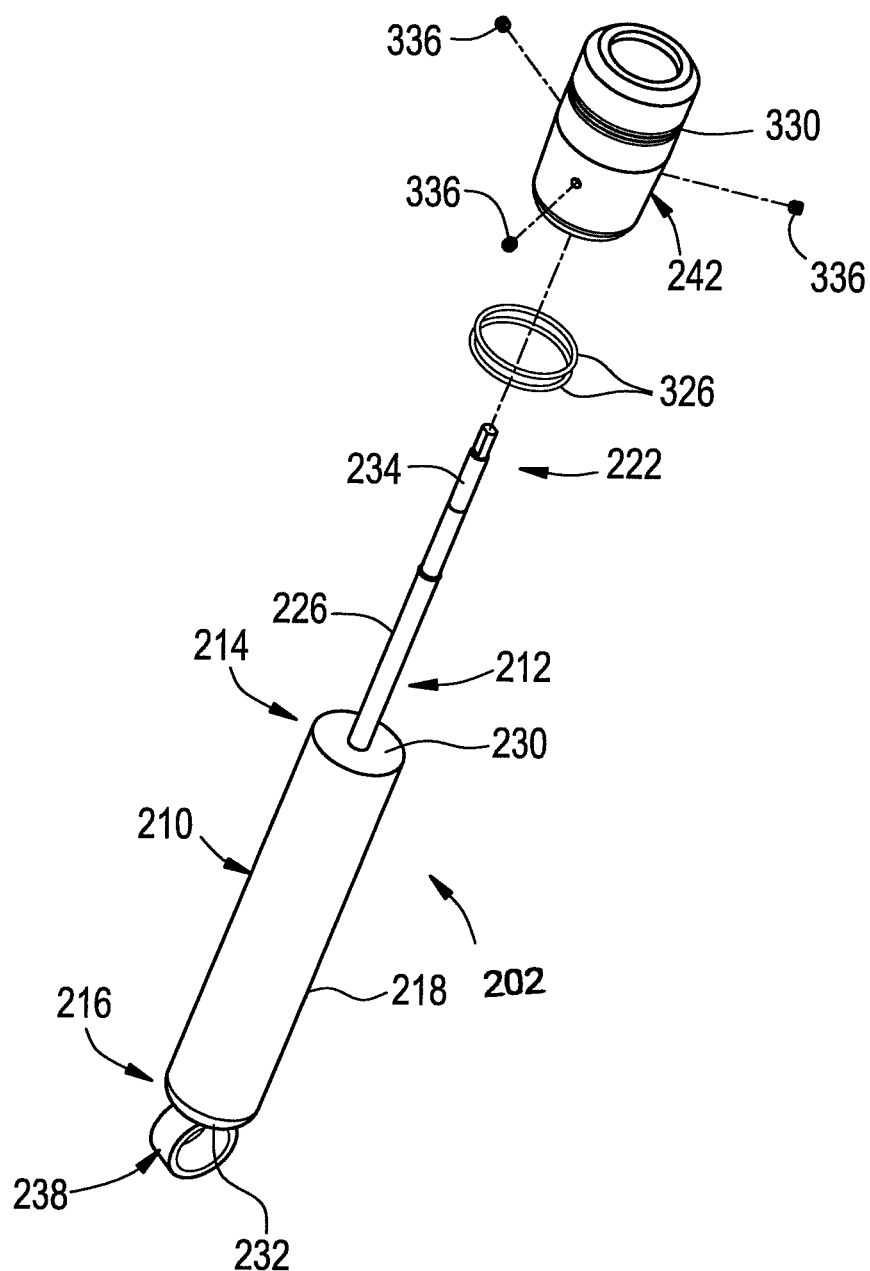
FIG. 7 is an exploded perspective view of a portion of the exemplary gas spring and damper assembly in FIGS. 2-6.
Figure 8:
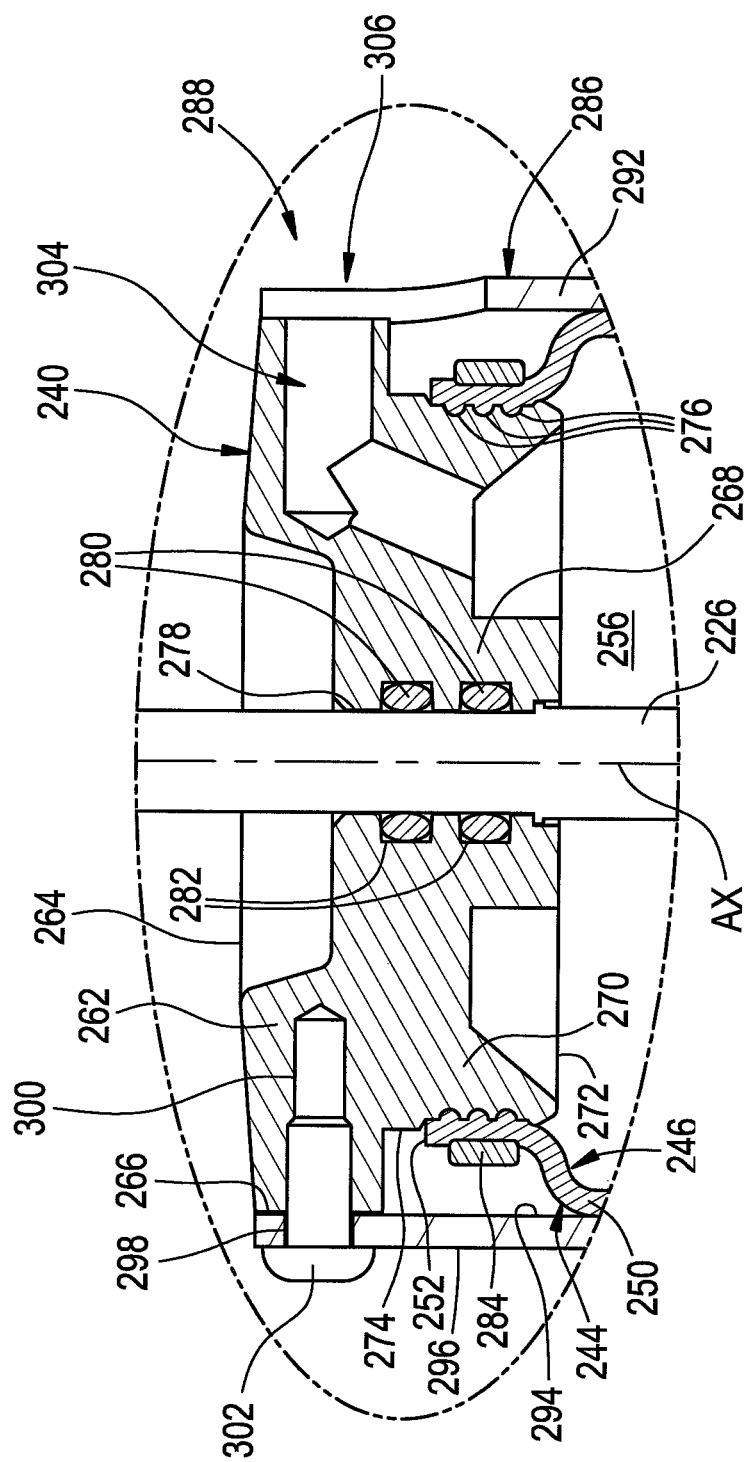
FIG. 8 is an enlarged view of the portion of the exemplary gas spring and damper assembly in FIGS. 2-7 identified as Detail 8 in FIG. 5.

As identified in FIGS. 5 and 6, gas spring and damper assembly 200 has a longitudinally-extending axis AX and extends axially between opposing ends 206 and 208. Damper assembly 202 and gas spring assembly 204 can be operatively secured to one another around and along axis AX. Damper assembly 202 is shown as including a damper housing 210 and a damper rod assembly 212 that is at least partially received in the damper housing. As identified in FIGS. 5-7, damper housing 210 extends axially between opposing housing ends 214 and 216, and includes a housing wall 218 that at least partially defines a damping chamber 220. Damper rod assembly 212 extends lengthwise between opposing ends 222 and 224 and includes an elongated damper rod 226 and a damper piston 228 disposed along end 224 of damper rod assembly 212. Damper piston 228 is received within damping chamber 220 of damper housing 210 for reciprocal movement along the housing wall in a conventional manner. A quantity of damping fluid DPF can be disposed within damping chamber 220, and damper piston 228 can be displaced through the damping fluid to dissipate kinetic energy acting on gas spring and damper assembly 200. Though damper assembly 202 is shown and described herein as having a conventional construction in which a hydraulic fluid is contained within at least a portion of damping chamber 220, it will be recognized and appreciated that dampers of other types, kinds and/or constructions, such as pressurized gas or "air" dampers, for example, could be used without departing from the subject matter of the present disclosure.

Housing wall 218 can form an opening (not numbered) along housing end 214. A damper end wall 230 can extend across the opening and can be secured on or along housing wall 218 such that a substantially fluid-tight connection is formed therebetween. Damper end wall 230 can include an opening (not numbered) and elongated damper rod 226 can extend axially outward from damping chamber 220 through the opening in a direction opposite housing end 216. Additionally, a damper end wall 232 can be connected across end 216 of damper housing 210 such that a substantially fluid-tight connection is formed therebetween.

Elongated damper rod 226 projects outwardly from damper end wall 230 such that end 222 of the damper rod assembly is outwardly exposed from the damper housing and is externally accessible with respect to the damper housing. A connection feature 234, such as a plurality of threads, for example, can be provided on or along the elongated rod for use in operatively connecting gas spring and damper assembly 200 to an associated vehicle structure, a component of gas spring assembly 204 or another component of gas spring and damper assembly 200.

Figure 3:
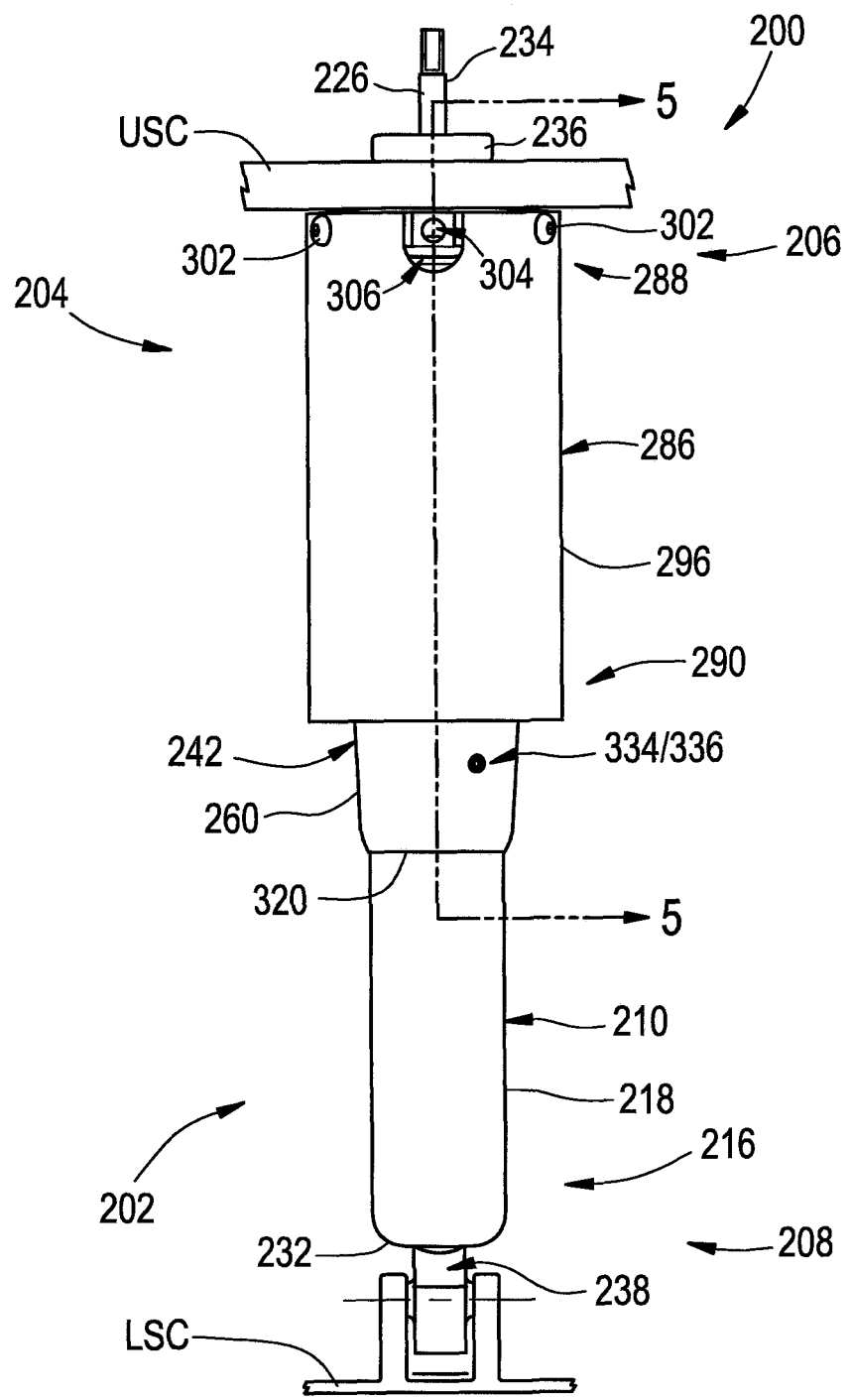
FIG. 3 is a front elevation view of the exemplary gas spring and damper assembly in FIG. 2.
Figure 4:
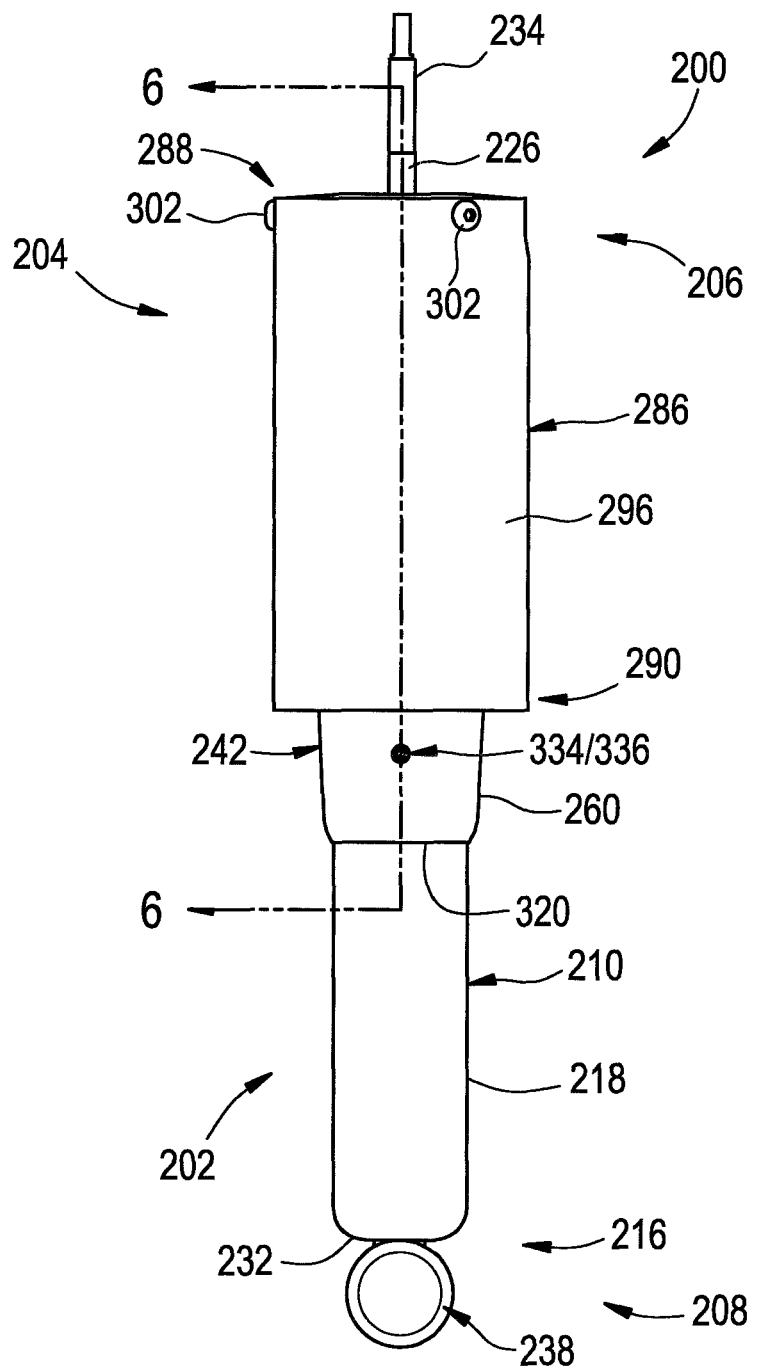
FIG. 4 is a side elevation view of the exemplary gas spring and damper assembly in FIGS. 2 and 3.

It will be appreciated that gas spring and damper assembly 200 can be operatively connected between associated sprung and unsprung masses of an associated vehicle (or other construction) in any suitable manner. For example, one end of the assembly can be operatively connected to an associated sprung mass with the other end of the assembly disposed toward and operatively connected to an associated unsprung mass. As shown in FIG. 3, for example, end 206 of assembly 200 can be operatively engaged with a first or upper structural component USC, such as associated vehicle body BDY in FIG. 1, for example, and can be secured thereon in any suitable manner. As one example, upper structural component USC can be disposed in abutting engagement with a component of gas spring assembly 204 and secured thereto by way of a securement device 236 operatively engaging connection feature 234. It will be appreciated that other configurations and/or arrangements could alternately be used.

Additionally, or in the alternative, end 208 of assembly 200 can be secured on or along a second or lower structural component LSC, such as associated axle AXL in FIG. 1, for example, and can be secured thereon in any suitable manner. For example, damper assembly 202 can be operatively connected to lower structural component LSC and can be secured thereto in any suitable manner. For example, damper assembly 202 can include a connection feature 238, such as a pivot or bearing mount (not shown), for example, that is operatively disposed along damper housing 210 and is adapted for securement to lower structural component LSC in a suitable manner.

Gas spring assembly 204 can include an end member 240, such as a top cap, bead plate or reservoir enclosure, for example. Gas spring assembly 204 can also include an end member 242, such as a roll-off piston or piston assembly, for example, that is disposed in axially-spaced relation to end member 240. A flexible spring member 244 extends axially between opposing ends 246 and 248, and peripherally around longitudinal axis AX. Flexible spring member 244 can be operatively interconnected with components of the gas spring assembly and/or gas damper assembly in any suitable manner. For example, in some cases, one or both ends of the flexible spring member can, optionally, include a mounting bead (not shown) or other connection feature, such as may include a reinforcing element (e.g., a bead wire) or other suitable component, for example. In other cases, the flexible spring member can take the form of an elongated sleeve with one or more cut ends along which the reinforcing cords of the flexible spring member are exposed.

In the exemplary arrangement shown in FIGS. 2-6 and 8, flexible spring member 244 includes a flexible wall 250 that extends axially between a cut edge 252 formed along end 246 and a cut edge 254 disposed along end 248. Flexible spring member 244 can be operatively connected between end members 240 and 242 in a substantially fluid-tight manner such that a spring chamber 256 is at least partially defined therebetween. In some cases, a portion of flexible spring member 244 can form a rolling lobe 258 that is displaced along an outer side surface portion 260 of end member 242 as gas spring and damper assembly 200 moves between extended (i.e., rebound) and compressed (i.e., jounce) conditions, as is well understood in the art.

It will be appreciated that end members 240 and 242 can be of any suitable type, kind, configuration and/or construction. Additionally, it will be appreciated that end members 240 and 242 can be formed from any suitable material or combination of materials. As non-limiting examples, such materials can include metal materials (e.g., steel and/or aluminum) and/or polymeric materials (e.g., such as fiber-reinforced polypropylene, fiber-reinforced polyamide, unreinforced (i.e., relatively high modulus) polyester, polyethylene, polyamide, polyether, or any combination thereof. As such, it will be appreciated that end member 240 and 242 can include any suitable number or combination of walls and/or wall portions.

With reference now to FIGS. 2, 3, 5, 6 and 8, end member 240 is shown as including an end member wall (not numbered) with an end wall portion 262 that at least partially defines an outer end surface portion 264 and an outer peripheral side surface portion 266 of the end member. End member 240 also includes an inner side wall portion 268 and an outer side wall portion 270 disposed radially outward of inner side wall portion 268. Outer side wall portion 270 extends axially from along end wall portion 262 toward an inward edge 272, and includes an outer surface portion 274 along which end 246 of flexible spring member 244 can be secured in a suitable manner. In some cases, outer side wall portion 270 can include one or more retention features 276 formed therealong, such as may be suitable for abuttingly engaging flexible wall 250 of flexible spring member 244. As one non-limiting example, retention features 276 can include one or more annular grooves extending radially inward into outer side wall portion 270 from along outer surface portion 274.

Inner side wall portion 268 includes an inner surface portion 278 that at least partially defines a passage (not numbered) extending through end member 240 that is dimensioned to receive at least a portion of end 222 of the elongated damper rod of damper rod assembly 212. In some cases, it may be beneficial for a substantially fluid-tight seal to be formed between end member 240 and elongated damper rod 226. In such cases, one or more sealing elements 280, such as O-rings, for example, can be sealingly disposed between the end member and the elongated damper rod, and can be secured or otherwise retained in sealing engagement therebetween in any suitable manner. As one example, end member 240 can include one or more annular grooves 282 that extend radially outward into inner side wall portion 268 from along inner surface portion 278, and which are dimensioned to at receiving and retain at least a portion of one or more of sealing elements 280. It will be appreciated, however, that other configurations and/or arrangements could alternately be used.

As indicated above, end 246 of flexible spring member 244 can be secured on or along end member 240 in any suitable manner. As one example, a portion of flexible wall 250 along end 246 can be disposed in abutting engagement with outer surface portion 274 and retention features 276, if included. A retaining ring 284 can extend annularly around the flexible wall radially outward of outer side wall portion 270. Retaining ring 284 can be crimped or otherwise deformed radially inward such that a substantially fluid-tight connection is formed between flexible wall 250 and outer side wall portion 270. As discussed above, however, it will be appreciated that other configurations and/or arrangements could alternately be used.

Gas spring and damper assembly 200 can, optionally, include an external sleeve or support that can extend coextensively along at least a portion of the flexible spring member. As one example, a restraining cylinder 286 can extend axially between opposing open ends 288 and 290, and can include a cylinder wall 292 that extends annularly about longitudinal axis AX. Cylinder wall 292 can include an inner surface 294 dimensioned to abuttingly engage an outer surface (not numbered) of flexible spring member 244, and an outer surface 296 facing radially outward. Restraining cylinder 286 can be secured on or along one or more components of the gas spring assembly in any suitable manner. As one example, end 288 can be dimensioned to receive end member 204 with outer peripheral side surface portion 266 disposed in facing relation to inner surface 294 of the restraining cylinder. One or more openings or holes 298 can extend through cylinder wall 292 along end 288. In a preferred arrangement, holes 298 can be disposed in approximate alignment with securement features 300, such as threaded holes, for example, that extend into end wall portion 262 of end member 240 from along outer peripheral side surface portion 266. In which case, securement devices 302, such as threaded fasteners, for example can extend through holes 298 in operative engagement with securement features 300 to secure and retain restraining cylinder 286 on or along end member 240. It will be appreciated, however, that other configurations and/or arrangements could alternately be used.

Gas spring assembly 204 preferably includes a communication port in fluid communication with spring chamber 256, such as may be used for transferring pressurized gas into and/or out of the gas spring assembly, for example. It will be appreciated that such a fluid communication port can be provided in any suitable manner. As one example, end member 240 can include a transfer passage 304 extending through end wall portion 262 of the end member wall. It will be appreciated, however, that any other suitable fluid communication arrangement could alternately be used. In some cases, transfer passage 304 can be adapted to receive a suitable connector fitting, such as may be suitable for operatively connecting gas transfer lines 122 (FIG. 1), for example, to the gas spring and damper assembly. In such cases, the connector fitting may be expected project outwardly from end member 240. In which case, a recess or opening 306 can be formed on or along end 288 of restraining cylinder 286 to provide access to transfer passage 304 and provide clearance for any connector fitting that may be secured therealong.

With reference, now, to FIGS. 2-7, 9 and 10, end member 242 is shown as including an end member wall (not numbered) with an end wall portion 308 that is oriented transverse to longitudinal axis AX. End wall portion 308 includes an inner end surface portion 310 disposed in facing relation to spring chamber 256 and an outer end surface portion 312 facing toward damper end wall 230. Additionally, end wall portion 308 includes an inner side surface portion 314 that at least partially defines an inner opening 316 extending through the end wall portion and through which elongated damper rod 226 of damper rod assembly 212 can extend.

The end member wall of end member 242 can also include a side wall portion 318 that extends from along end wall portion 308 to a distal edge 320. Side wall portion 318 can define an inner side surface portion 322 as well as outer side surface portion 260 that extend from along end wall portion 308 toward distal edge 320 as well as annularly about longitudinal axis AX. Inner end surface portion 310 and inner side surface portion 322 at least partially define an end member recess 324 that is dimensioned to receive at least a portion of damper housing 210. In some cases, it may be beneficial for a substantially fluid-tight seal to be formed between end member 242 and damper housing 210. In such cases, one or more sealing elements 326, such as O-rings, for example, can be sealingly disposed between the end member and the damper housing, and can be secured or otherwise retained in sealing engagement therebetween in any suitable manner. As one example, end member 242 can include one or more annular grooves 328 that extend radially outward into side wall portion 318 from along inner side surface portion 322, and which are dimensioned to at receiving and retain at least a portion of one or more of sealing elements 326. It will be appreciated, however, that other configurations and/or arrangements could alternately be used.

As indicated above, end 248 of flexible spring member 244 can be secured on or along end member 242 in any suitable manner. In some cases, side wall portion 318 can, optionally, include one or more retention features 330 formed therealong, such as may be suitable for abuttingly engaging flexible wall 250 of flexible spring member 244. As one non-limiting example, retention features 330 can include one or more annular grooves extending radially inward into side wall portion 318 from along outer side surface portion 260. In which cases, a portion of flexible wall 250 along end 248 can be disposed in abutting engagement with outer side surface portion 260 and retention features 330, if included. A retaining ring 332 can extend annularly around the flexible wall radially outward of side wall portion 318. Retaining ring 332 can be crimped or otherwise deformed radially inward such that a substantially fluid-tight connection is formed between flexible wall 250 and side wall portion 318. As discussed above, however, it will be appreciated that other configurations and/or arrangements could alternately be used.

In an inflated condition of gas spring and damper assembly 200, end members 240 and 242 are urged by the pressurized gas in a direction away from one another. With end member 240 secured along end 222 of damper rod assembly 212, end member 242 is urged and maintained in abutting engagement with damper housing 210. In some situations, however, gas spring and damper assembly 200 may experience an uninflated or underinflated condition in which end member 242 could disadvantageously become displaced from or otherwise disassociated with the desired position on or along the damper housing. As such, an end member in accordance with the subject matter of the present disclosure is constructed to be securable on or along the damper housing. That is, an end member in accordance with the subject matter of the present disclosure can include at least one securement device that releasably interconnects the end member and the damper housing.

Figure 9:
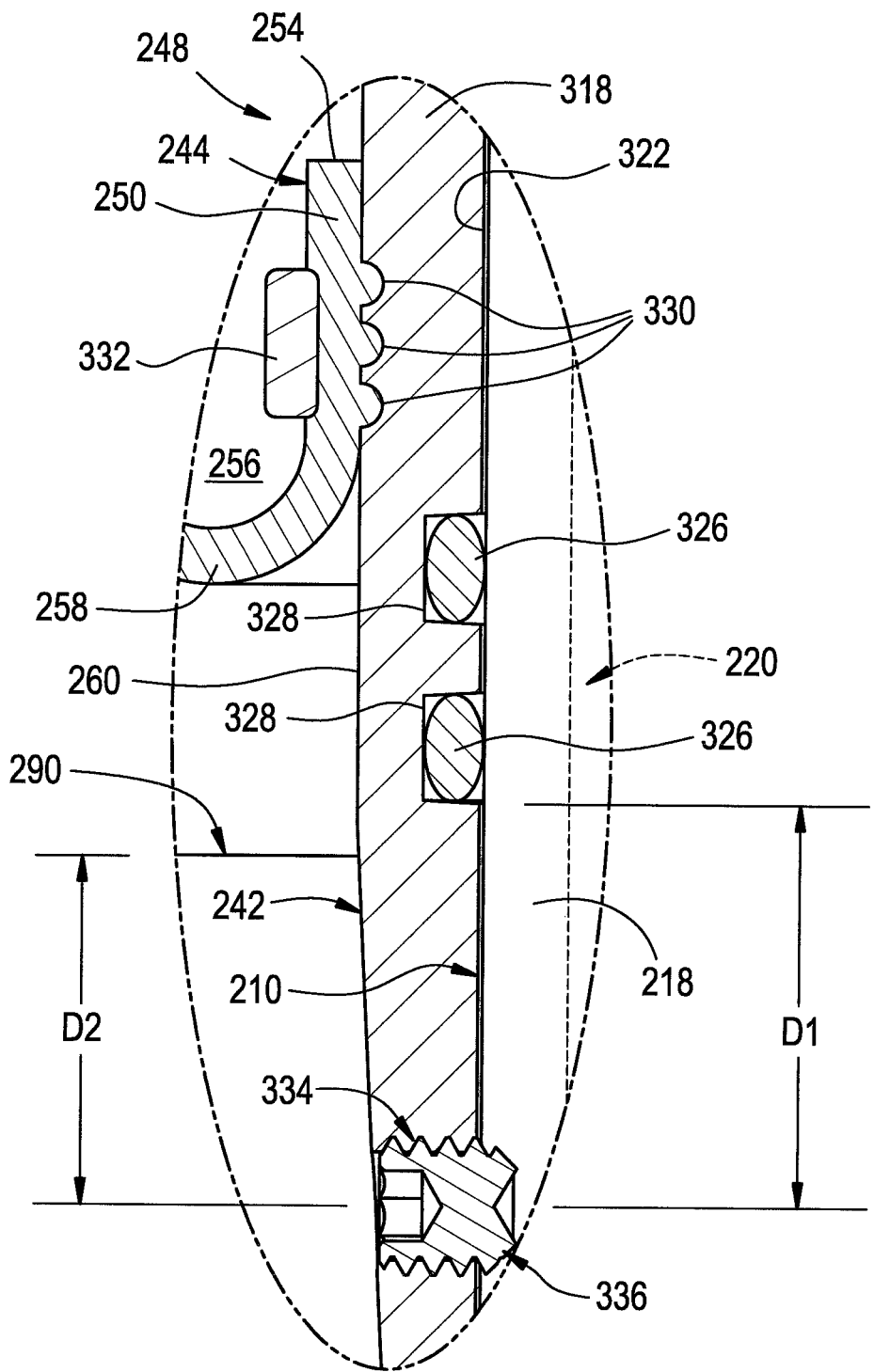
FIG. 9 is an enlarged view of the portion of the exemplary gas spring and damper assembly in FIGS. 2-7 identified as Detail 9 in FIG. 6.
Figure 10:
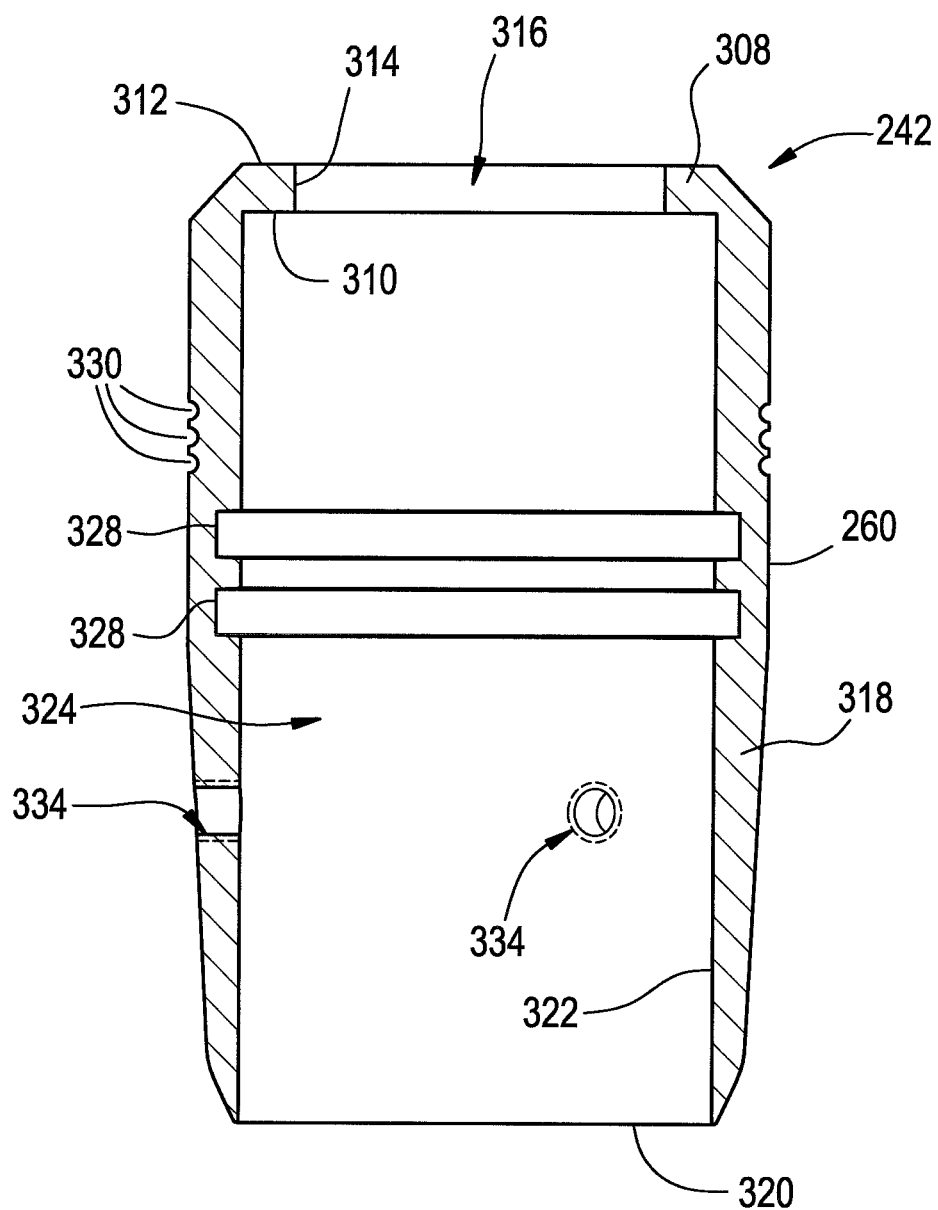
FIG. 10 is a cross-sectional side elevation view of one exemplary gas spring end member in accordance with the subject matter of the present disclosure, such as is shown in FIGS. 2-7 and 9.

As one example of a suitable construction, end member 242 can include one or more securement features formed on or along the end member wall thereof. In a preferred arrangement, end member 242 can include a plurality of securement features disposed in peripherally-spaced relation to one another such that multiple engagement points with the damper housing can be formed. In the arrangement shown in FIGS. 2-7, 9 and 10, end member 242 can include a plurality of securement features 334, such as threaded passages, for example, extending through side wall portion 318 in spaced relation to one another about longitudinal axis AX. Securement devices 336, such as threaded fasteners, for example, can operatively connect with securement features 334 to retain securement devices 336 in operatively engagement with housing wall 218 of damper housing 210. In a preferred arrangement, securement devices 336 can take the form of set screws or other fasteners that can be operatively engaged with the damper housing while remaining recessed within side wall portion 318 of end member 242, such as is shown in FIGS. 6 and 9, for example. In this manner, as gas spring and damper assembly 200 is displaced into a compressed condition, rolling lobe 258 can be displaced through open end 290 of restraining cylinder 286 and along outer side surface portion 260 of the end member without contacting securement device 336.

Additionally, in a preferred arrangement, securement features 334 and securement devices 336 can be spaced from end wall portion 308 a greater distance than sealing elements 326 and/or annular grooves 328 such that a non-zero distance extends between securement features 334 and securement devices 336 and sealing elements 326 and/or annular grooves 328, such as is represented in FIG. 9 by reference dimension D1. In this manner, securement features 334 and securement devices 336 are disposed in fluid communication with an external atmosphere and fluidically isolated from spring chamber 256. Additionally, or in the alternative, securement features 334 and securement devices 336 can be spaced apart from distal edge 320 by a distance that is less than a distance between open end 290 of restraining cylinder 286 and distal edge 320 such that a non-zero distance extends between securement features 334 and securement devices 336 and open end 290 of restraining cylinder 286, such as is represented in FIG. 9 by reference dimension D2. In this manner, securement devices 336 can be accessed in an assembled condition of gas spring and damper assembly 200.

As used herein with reference to certain features, elements, components and/or structures, numerical ordinals (e.g., first, second, third, fourth, etc.) may be used to denote different singles of a plurality or otherwise identify certain features, elements, components and/or structures, and do not imply any order or sequence unless specifically defined by the claim language. Additionally, the terms "transverse," and the like, are to be broadly interpreted. As such, the terms "transverse," and the like, can include a wide range of relative angular orientations that include, but are not limited to, an approximately perpendicular angular orientation. Also, the terms "circumferential," "circumferentially," and the like, are to be broadly interpreted and can include, but are not limited to circular shapes and/or configurations. In this regard, the terms "circumferential," "circumferentially," and the like, can be synonymous with terms such as "peripheral," "peripherally," and the like.

Furthermore, the phrase "flowed-material joint" and the like, if used herein, are to be interpreted to include any joint or connection in which a liquid or otherwise flowable material (e.g., a melted metal or combination of melted metals) is deposited or otherwise presented between adjacent component parts and operative to form a fixed and substantially fluid-tight connection therebetween. Examples of processes that can be used to form such a flowed-material joint include, without limitation, welding processes, brazing processes and soldering processes. In such cases, one or more metal materials and/or alloys can be used to form such a flowed-material joint, in addition to any material from the component parts themselves. Another example of a process that can be used to form a flowed-material joint includes applying, depositing or otherwise presenting an adhesive between adjacent component parts that is operative to form a fixed and substantially fluid-tight connection therebetween. In such case, it will be appreciated that any suitable adhesive material or combination of materials can be used, such as one-part and/or two-part epoxies, for example.

Further still, the term "gas" is used herein to broadly refer to any gaseous or vaporous fluid. Most commonly, air is used as the working medium of gas spring devices, such as those described herein, as well as suspension systems and other components thereof. However, it will be understood that any suitable gaseous fluid could alternately be used.

It will be recognized that numerous different features and/or components are presented in the embodiments shown and described herein, and that no one embodiment may be specifically shown and described as including all such features and components. As such, it is to be understood that the subject matter of the present disclosure is intended to encompass any and all combinations of the different features and components that are shown and described herein, and, without limitation, that any suitable arrangement of features and components, in any combination, can be used. Thus it is to be distinctly understood claims directed to any such combination of features and/or components, whether or not specifically embodied herein, are intended to find support in the present disclosure.

Thus, while the subject matter of the present disclosure has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles hereof. Obviously, modifications and alterations will occur to others upon reading and understanding the preceding detailed description. Accordingly, it is to be distinctly understood that the foregoing descriptive matter is to be interpreted merely as illustrative of the subject matter of the present disclosure and not as a limitation. As such, it is intended that the subject matter of the present disclosure be construed as including all such modifications and alterations.

The invention claimed is:

1. A gas spring and damper assembly comprising:
   a damper assembly having a longitudinally-extending axis and including:
      a damper housing including a housing wall extending axially between opposing first and second ends, said housing wall at least partially defining a damping chamber containing a quantity of damping fluid; and,
      a damper rod assembly including an elongated damper rod and a damper piston secured along said elongated damper rod, said damper rod assembly operatively interengaged with said damper housing for reciprocal displacement relative thereto with said damper piston disposed within said damping chamber and at least a portion of said elongated damper rod projecting axially-outwardly from said first end of said damper housing; and,
   a gas spring assembly including:
      a first end member supported on said elongated damper rod in substantially fixed axial relation thereto;
      a second end member supported on said damper housing in substantially fixed relation thereto, said second end member including at least one securement feature;
      a flexible spring member secured between said first and second end members to at least partially define a spring chamber; and,
      at least one securement device operatively engaging said damper housing, said at least one securement device operatively connected with said at least one securement feature of said second end member to retain said at least one securement device in operative engagement with said damper housing and thereby removably secure said second end member in said substantially fixed axial relation with said damper housing;
   wherein said gas spring assembly includes a sealing element sealingly disposed between said second end member and said damper housing to fluidically isolate said spring chamber from an external atmosphere;
   wherein said at least one securement feature and said at least one securement device are disposed in axially spaced relation to said sealing element such that said at least one securement feature and said at least one securement device are fluidically isolated from said spring chamber by said sealing element;
   wherein said second end member includes an end member wall, and said at least one securement feature includes a threaded passage extending through said end member wall; and
   wherein a wall thickness of said end member wall is greater proximate said sealing element than proximate said at least one securement feature.

2. A gas spring and damper assembly according to claim 1, wherein said at least one securement feature of said second end member includes a plurality of securement features disposed in peripherally spaced relation to one another about said longitudinal axis.

3. A gas spring and damper assembly according to claim 2, wherein said at least one securement device of said gas spring assembly includes a plurality of securement devices with said plurality of securement devices operatively engaging said damper housing through operative connection with one of said plurality of securement features.

4. A gas spring and damper assembly according to claim 1, wherein said second end member includes an end member wall having an outer surface, and said at least one securement device is recessed from said outer surface in an assembled condition.

5. A gas spring and damper assembly according to claim 1, wherein said at least one securement device is a threaded fastener.

6. A gas spring and damper assembly according to claim 5, wherein said threaded fastener is a set screw-type threaded fastener.

7. A gas spring and damper assembly according to claim 1, wherein said second end member includes an outer side surface portion, and said flexible spring member forms a rolling-lobe along said outer side surface portion that is displaceable therealong as said gas spring and damper assembly extends and compresses during use.

8. A gas spring and damper assembly according to claim 1 further comprising a restraining cylinder including an annular wall extending peripherally about said longitudinal axis and lengthwise between a first end disposed toward said first end member and a second end disposed toward said second end member, said annular wall including an inside surface disposed in abutting engagement with said flexible spring member.

9. A gas spring and damper assembly according to claim 8, wherein said at least one securement feature and said at least one securement device are disposed in axially spaced relation to said second end of said restraining cylinder such that said at least one securement feature and said at least one securement device are accessible in an assembled condition of said gas spring and damper assembly.

10. A gas spring end member assembly dimensioned for securement between an associated flexible spring member and an associated damper housing, said gas spring end member assembly comprising:
   an end member having a longitudinal axis and including an end member wall extending peripherally about said longitudinal axis and axially between a first end and a second end opposite said first end, said end member wall including an end wall portion oriented transverse to said longitudinal axis and a side wall portion extending axially from along said end wall portion to a distal edge, said end wall portion and said side wall portion at least partially defining an end member recess dimensioned to receive the associated damper housing, said side wall portion including an outer surface dimensioned for receiving the associated flexible spring member;
   at least one securement feature extending through said side wall portion, said at least one securement feature oriented transverse to said longitudinal axis and extending radially inward through said side wall portion; and,
   at least one securement device operatively connected with said at least one securement feature of said end member for retaining said at least one securement device in operative engagement with the associated damper housing;
   wherein said end member wall has a thickness that tapers from a first thickness to a second thickness along at least a portion of said longitudinal axis, said first thickness being greater than said second thickness.

11. A gas spring end member assembly according to claim 10, wherein said side wall portion includes an inner surface with at least one annular groove extending into said side wall portion from along said inner surface, said at least one annular groove dimensioned to receive an associated sealing element.

12. A gas spring end member assembly according to claim 11 further comprising said associated sealing element disposed within said annular groove.

13. A gas spring end member assembly according to claim 11, wherein said at least one securement feature and said at least one securement device are disposed in axially spaced relation to said annular groove in a direction away from said end wall portion of said end member wall.

14. A gas spring end member assembly according to claim 10, wherein said at least one securement feature includes a plurality of securement features disposed in peripherally spaced relation to one another about said longitudinal axis.

15. A gas spring end member assembly according to claim 14, wherein said at least one securement device includes a plurality of securement devices with said plurality of securement devices dimensioned to operatively engage the associated damper housing through operative connection with one of said plurality of securement features.

16. A gas spring end member assembly according to claim 10, wherein said at least one securement feature includes a threaded passage extending through said end member wall.

17. A gas spring end member assembly according to claim 10, wherein said side wall portion of said end member wall has an outer surface, and said at least one securement device is recessed from said outer surface in an assembled condition.

18. A gas spring end member assembly according to claim 13, wherein a wall thickness of said end member wall is greater proximate said associated sealing element than proximate said at least one securement feature.

* * * * *